June 13, 1950   T. G. BOLDIZZONI   2,511,456
MACHINE FOR TURNING AND PRESSING GLOVES
Filed July 12, 1947   6 Sheets-Sheet 1

INVENTOR.
TEOBALDO G. BOLDIZZONI
BY Paul Kolisch
ATTORNEY

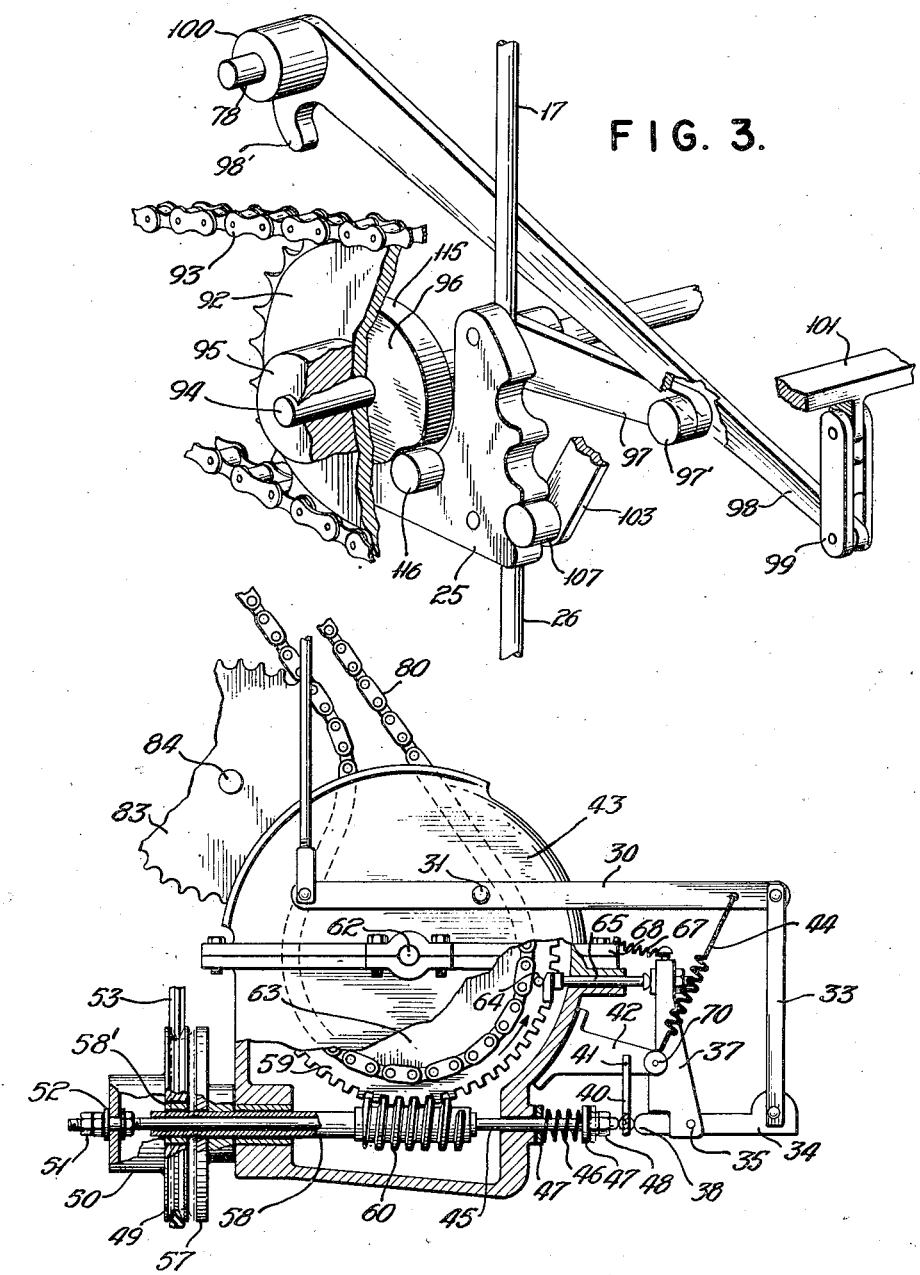

June 13, 1950     T. G. BOLDIZZONI     2,511,456
MACHINE FOR TURNING AND PRESSING GLOVES
Filed July 12, 1947     6 Sheets-Sheet 3

INVENTOR.
TEOBALDO G. BOLDIZZONI

BY Paul Kolisch
ATTORNEY

June 13, 1950

T. G. BOLDIZZONI 2,511,456

MACHINE FOR TURNING AND PRESSING GLOVES

Filed July 12, 1947

INVENTOR.
TEOBALDO G. BOLDIZZONI

BY Paul Kolisch

ATTORNEY

June 13, 1950  T. G. BOLDIZZONI  2,511,456
MACHINE FOR TURNING AND PRESSING GLOVES
Filed July 12, 1947  6 Sheets-Sheet 5
FIG. 8a.
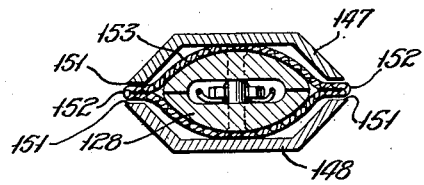
FIG. 8b.
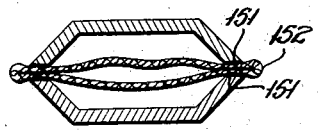
FIG. 10a.
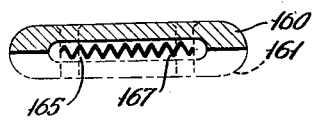
FIG. 9.
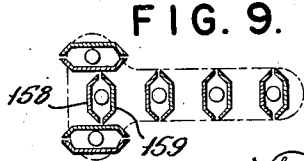
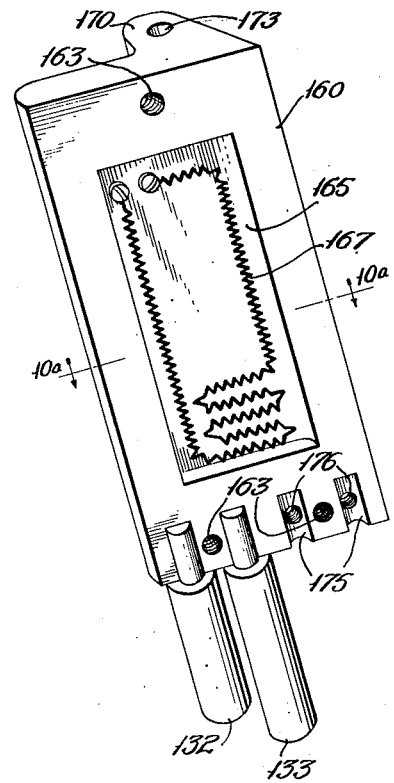
FIG. 10.
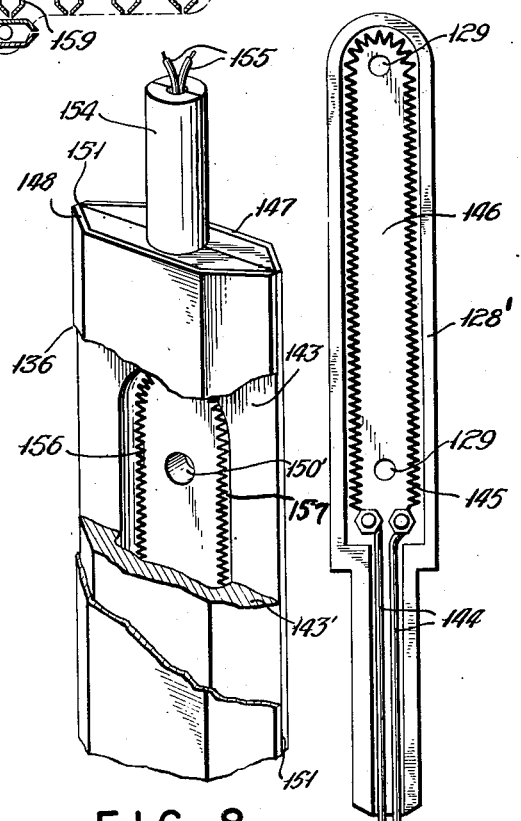
FIG. 8.  FIG. 7.
INVENTOR.
TEOBALDO G. BOLDIZZONI
BY Paul Kolisch
ATTORNEY June 13, 1950 — T. G. BOLDIZZONI — 2,511,456
MACHINE FOR TURNING AND PRESSING GLOVES
Filed July 12, 1947 — 6 Sheets-Sheet 6

INVENTOR.
TEOBALDO G. BOLDIZZONI
BY Paul Kolisch
ATTORNEY

Patented June 13, 1950

2,511,456

UNITED STATES PATENT OFFICE 2,511,456

MACHINE FOR TURNING AND PRESSING GLOVES

Teobaldo G. Boldizzoni, New York, N. Y.

Application July 12, 1947, Serial No. 760,607

15 Claims. (Cl. 223—57)

This invention relates to new and useful improvements in glove turning and pressing machines.

In my prior Patent No. 2,324,673 and copending application, Serial No. 596,456 I disclosed devices for ironing and pressing gloves.

The present invention combines a glove turning machine with the above mentioned devices.

The turning and pressing machines heretofore known covered a large amount of floor space because the different parts of the machine were situated one next to one another. In addition to the cost of floor space it was necessary to have several operators stationed about the machine.

The present invention overcomes these disadvantages as well as others by arranging the parts of the machine one on top of one another and according to one embodiment of the invention it is possible for one operator at one station to operate the whole machine.

According to the present invention a glove which has been turned wrong side out is placed by an operator on a turning form having individual hollow supporting elements for each finger and thumb which project down from the machine. The operator pushes the loaded turning form into the machine. Thereupon, the machine starts operating and plunger means are raised into the hollow supporting finger elements so as to tuck the material comprising each finger and the thumb up into its supporting element. Upon completion of the tucking operation, the plungers drop out of engagement with the supporting elements and the turning form is automatically moved out from the machine towards the operator and into end-to-end alignment with a glove supporting form. The operator transfers the glove from the turning form to the supporting form and in so doing the glove is turned right side out. The glove supporting form is then moved, as disclosed in my prior patent and copending application, into an ironing device which strips the glove from the form and presses it.

One of the features of my invention is the extensive use made of heat. According to my invention, each thumb supporting element and blade is individually heated as well as the whole glove turning form. As in my copending application and patent, I heat the glove supporting forms which deliver the turned gloves into the pressing device. I have found that the manner in which I use heat produces a more perfectly formed and pressed glove, and permits more rapid operation of the machine since a heated glove handles more easily than a cold one.

According to one embodiment of my invention, I provide a plurality rather than a single glove turning form on each of which a glove may be mounted. In this way each glove is well heated by the time it reaches the tucking position. Such an arrangement is particularly desirable in the case of all leather or partly leather gloves which handle much better when heated.

In order more fully to explain my invention reference is had to the following detailed description and accompanying drawings, in which:

Fig. 2 is a side elevation, partly in section and broken away, of the clutch;

Fig. 3 is a perspective view of the plunger carriage lifting means;

Fig. 7 is a side elevation of one half of a thumb blade;

Fig. 8 is a perspective view partly broken away of a thumb supporting element;

Fig. 8a is a horizontal cross section of the thumb supporting element having a glove thumb mounted thereon and with the thumb blade inserted therein;

Fig. 8b is a horizontal cross section on the line 8b—8b (Fig. 6) showing the thumb supporting element with a glove thumb thereon after the thumb blade has been removed;

Fig. 9 is a top plan view of an embodiment of my invention in which the finger as well as the thumb supporting elements on the turning form are made out of two separable pieces;

Fig. 10 is a perspective view of one half of the glove turning form;

Fig. 10a is a cross section on the line 10a—10a of Fig. 10, and

Figure 1:
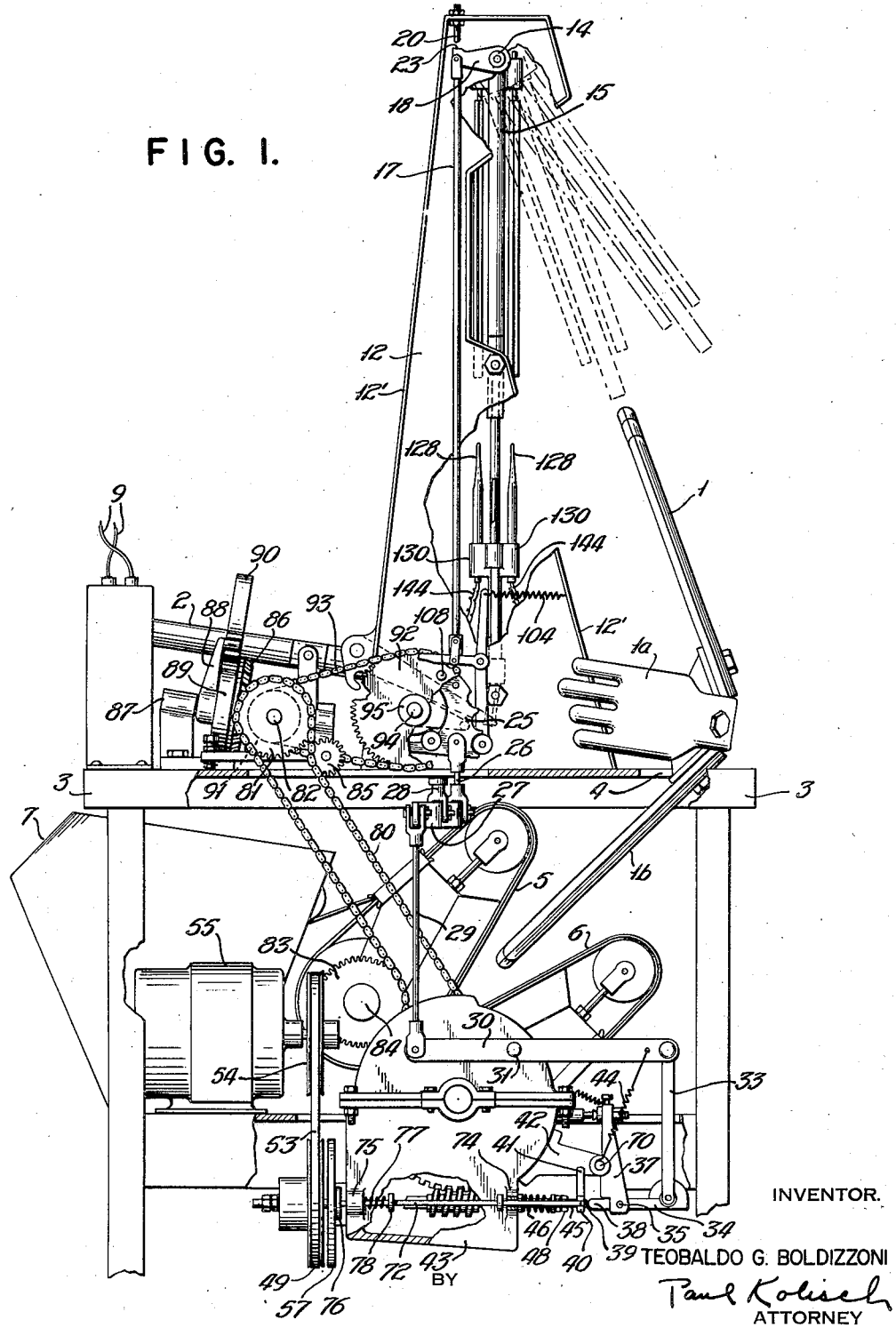
Fig. 1 is a side elevation, partly broken away, of the machine.

As described in my prior Patent No. 2,324,673 and copending application, Serial No. 596,456, four glove supporting forms, only three of which 1, 1a and 1b are shown, are suitably fastened to one end of a hollow longitudinal shaft 2 rotatably supported on table 3. The supporting forms are equally spaced from one another and fastened to one end of shaft 2 at an acute angle to the longitudinal axis of the shaft. Shaft 2 moves one form after the other in a plane substantially perpendicular to the table and through an opening 4 therein. Two endless driven belts, 5 and 6 remove a glove from each form, iron it, and finally eject it at 7. The glove forms are individually heated by coils similar to those disclosed in my copending application and are connected to conductors 9 passing through hollow shaft 2.

The superstructure of the machine consists of two pieces 12 secured to table 3 and held together at the top by a bar 13. A flange 12' is formed around the edges of each piece 12 and adds to their strength as well as providing a surface to which bolts, springs, and other elements of the machine may be attached.

A glove turnnig form 15 mounted on a shaft 14 is movable through an arc which passes through the plane of a raised supporting form, such as 1. Turning form 15 is movable into three positions: a loading position shown in dot-dash lines (Fig. 1) in which its plane intersects the plane of a raised supporting form; a tucking position shown in solid lines in which the plane of the turning form is perpendicular to the table; and a turning position shown in dotted lines in which the turning form's plane is the same as that of a raised supporting form. Superstructure 12 is sufficiently elevated above table 3 so that turning form 15 in all three posiitons is above the supporting forms.

The movement of turning form 15 actuates shaft 14 and controls the operation of the machine in the following manner: With glove form 15 in the glove loading position (dot-dash lines, Fig. 1) rod 17 is held all the way down. After a glove has been put on form 15 it is manually swung into tucking position (solid lines Fig. 1) and in so doing rod 17 is pulled all the way up by crank 18 connected between shaft 14 and rod 17. Bolt 20 projecting down from flange 12' at the top of superstructure 12 is so positioned that it will bear against raised surface 23 of crank 18 when the turning form is centered in tucking position. Thus bolt 20 acts as a positive stop preventing over rotation of form 15. A notched link 25 is connected between rod 17 and rod 26 which is connected to one end of lever 27. The latter is centrally held by a yoke 28 attached to the bottom of table 3. The other end of lever 27 is attached to rod 29 which is attached to one end of lever 30 pivoted at 31. The other end of lever 30 is connected to a rod 33 which is fastened to one end of a rod 34 pivotally attached at 35 to a rocker arm 37. End 36 of rod 34 normally engages roller 39 of pendulum 40 pivotally fastened at 41 to projection 42 of housing 43. Roller 39 presses against the right hand end of a clutch shaft 45 and transmits thereto the linear pressure of rod 34. A spring 44 connected between the right hand end of lever 30 and projection 42 tends to hold lever 30 down and thereby align rod 34 with shaft 45.

A clutch is situated beneath the table and acts to couple a source of power to the rest of the machine. The clutch is controlled by the turning form and when the latter is swung into tucking position the clutch is engaged and plunger means moved into contact with the form. Upon the completion of the tucking operation the turning form is automatically swung out into turning position and the clutch disengaged.

The clutch (Fig. 2) comprises a shaft 45 having a spring 46 mounted thereon under tension between washers 47 and lock nuts 48 which tends to move shaft 45 to the right. Near the other end of shaft 45 a continually rotating wheel 49 is mounted on a bushing 58' supported on a hollow shaft 58 through which shaft 45 passes. A thrust bearing 50 is mounted by lock nuts 51 and washer 52 between the left end of shaft 45 and wheel 49. Wheel 49 is rotated by belt 53 connected to wheel 54 of motor 55 (Fig. 1). When wheel 49 is moved to the right it frictionally engages a plate 57 mounted on shaft 58. Shaft 58 engages worm gear 59 within housing 43 by means of worm 60 and rotates the gear in the direction of the arrow (Fig. 2). Worm gear 59 rotates a shaft 62 on which a sprocket wheel 63 is mounted. A lug 64 on worm gear 59 contacts one end of a short rod 65 projecting within housing 43. The other end of rod 65 contacts rocker arm 37. Spring 67 connected between the top of rocker 37 and projection 68 from housing 43 tends to rotate the lower end of rocker 37 about pivot 70 towards the housing.

A sprocket chain 80 connects sprocket wheel 63 with sprocket wheel 81 (Fig. 1) mounted on a shaft 82 resting on top of table 3. Another sprocket wheel 83 mounted on a shaft 84 near sprocket wheel 63 is engaged by the lower reach of chain 80. The rotation of shaft 84 controls the ironing and pressing operations as described in my copending application. In order to give sprocket chain 80 the proper tension a small sprocket wheel 85 engages the upper reach of the chain near wheel 81.

A bevelled gear (not shown) near the end of shaft 82 opposite from sprocket wheel 81 engages at right angles a larger bevelled gear 86 mounted on a shaft (not shown) rotatably supported in a bracket 87. Gear 86 actuates Geneva stop gear 90, mounted on shaft 2, by pin 88 and plate 89. The gearing of the machine is such that one rotation of worm gear 59 produces a quarter turn of shaft 2 which has the four glove forms mounted on it. The glove forms are spaced so that one of them is moved into the ironing device between belts 5 and 6 and another into position for alignment with turning form 15.

Another sprocket wheel 91 mounted on shaft 82 is connected to a sprocket wheel 92 by sprocket chain 93 (Figs. 1 and 3). Wheel 92 is mounted on a shaft 94 by a bushing 95. Shaft 94 extends through superstructure pieces 12 and has mounted on it near wheel 92 a positioning cam 96 (Fig. 3). Two lifting cams 97 (only one of which is shown) mounted on shaft 94 between pieces 12 engage levers 98 (only one of which is shown) which are connected by links 99 to the bottom of plunger carriage 101. Levers 98 are rotatably fixed by hubs 100 to the superstructure and hooks 98' are provided so that projections 97' of cams 97 will engage the hooks and dislodge carriage 101 if it should become stuck in the raised position.

While I have shown two cams for lifting the carriage it would be possible to have some positive connection between shaft 94 and carriage 101 which would lower as well as lift the carriage.

Figure 4:
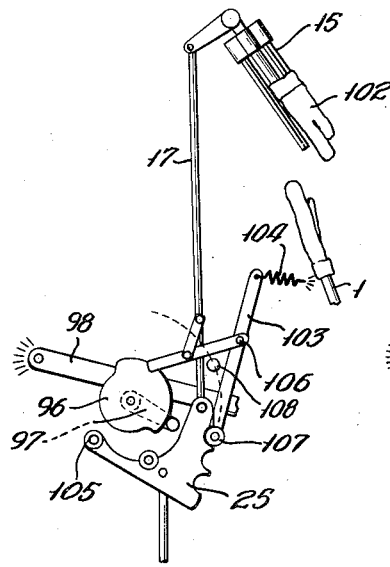
Figs. 4–4d are schematic diagrams showing various stages in the operation of the machine.
Figure 4A:
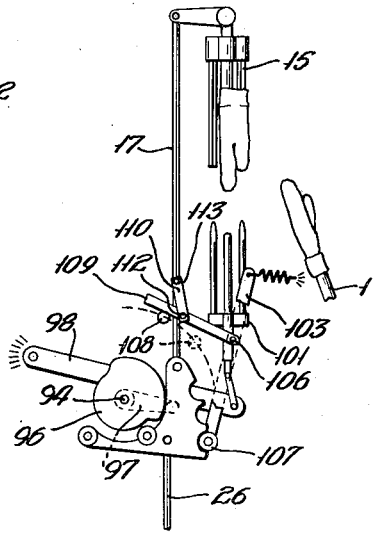
Figure 4B:
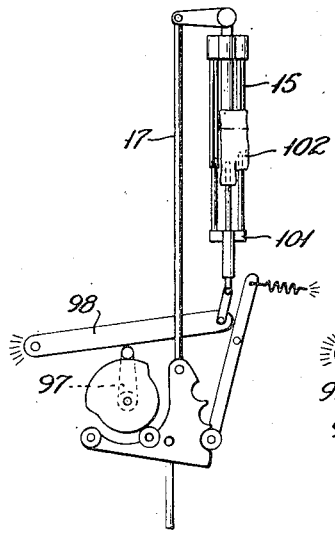
Figure 4C:
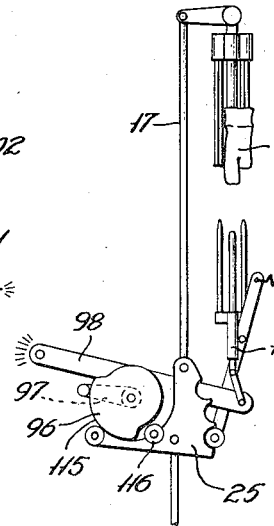
Figure 4D:
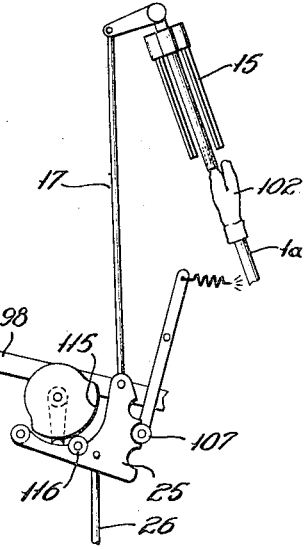

As shown in Figs. 4–4d the the rotation of shaft 94 results in the raising and lowering of carriage 101 as well as movement of turning form 15 from the tucking position to the turning position.

In Fig. 4 form 15 has just had a wrong side out glove 102 placed on it. Lifting cams 97 (shown in dotted lines) do not as yet contact levers 98 and notched link 25 pivoted at 105 has been pushed down and away from cam 96 by rod 17.

A centering lever 103 is held at one end by a spring 104 fastened to the flange of the superstructure. Lever 103 is pivoted at 106 and engages by means of roller 107 the upper notch of link 25 thereby insuring that rod 17 will be held down and turning form 15 held in the loading position.

In Fig. 4a the operator of the machine has moved form 15 into tucking position. Rod 17 is thereby pulled up engaging, via rod 26, the clutch as above described, and the machine starts operating. Roller 107 now engages the lower notch on link 25 which has been moved up close to cam 96 against the restraining pressure of the roller and lever 103. Shaft 94 is rotated and as lifting cams 97 engage levers 98 to lift the carriage 101, a lug 108 on wheel 92 (not shown) will engage a safety lever 109 if form 15 was not completely pushed into tucking position and alignment with the carriage by the operator. Lever 109 is connected to lever 103 at pivot 106 and pivotally attached to link 110 at 112. Link 110 is connected by pin 113 to rod 17. The operation of the safety lever insures that the glove turning form is properly aligned with plunger carriage 101 before the latter is raised thereby preventing injury to the machine or gloves.

In Fig. 4b carriage 101 has been lifted the desired height and tucked the fingers and thumb of glove 102. Lifting cams 97 are at the breaking point in their contact with levers 98.

In Fig. 4c cams 97 have just broken contact with levers 98 and carriage 101 is in the process of falling down and out of engagement with glove 102. Raised surface 115 on cam 96 is just about to engage lug 116 on link 25 and supporting form 1a has been rotated into turning position in place of form 1.

In Fig. 4d surface 115 has engaged lug 116 thereby moving link 25 one notch down so that roller 107 is now in the middle notch. This movement of link 25 pulls rod 17 down sufficiently to rotate form 15 out of tucking position and into turning position in which it is in end to end alignment with supporting form 1a. At an appropriate interval thereafter corresponding to the time it takes for cam 96 to move from the position shown in Fig. 4d to that of Fig. 4, gear 59 completes its rotation and the clutch is disengaged as explained above. It will be noted that the operator cannot move form 15 back into tucking position at this stage (Fig. 4d) because lug 116 is bearing against surface 115. This prevents the operator from prematurely pushing form 15 into operative position. The operator now removes the glove from form 15 by grasping with both hands the material forming the wrist of the glove and pulling down towards glove form 1a. Since the fingers and thumb of the glove have been tucked as above described the operator turns the rest of the glove in moving it from form 15 to form 1. The operator then moves form 15 into the loading position and another glove may be placed on form 15 (Fig. 4).

In order to prevent continued operation of the machine after the clutch has been disengaged a brake (Fig. 1) is provided which stops plate 57 from rotating. Rod 72 of the brake is connected at one end to pendulum 40 and supported from housing 43 by brackets 74 and 75. A brake shoe 76 is mounted on the other end of rod 72 near wheel 57 and is pressed against it when pendulum 40 moves to the left under pressure of rod 34. A spring 77 is mounted on rod 72 between bracket 75 and collar 78 and normally tends to hold brake shoe 76 out of contact with wheel 57.

Figure 5:
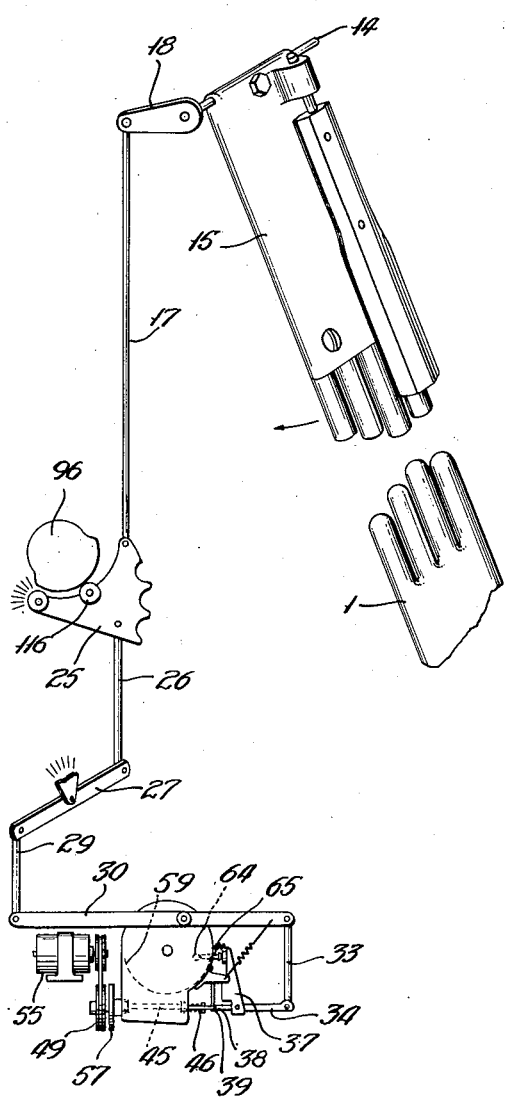
Fig. 5 is a schematic diagram showing the connection between the glove turning form and clutch.

The manner in which the movement of the glove form 15 controls the operation of the clutch will be more clearly understood by reference to Fig. 5 in which the connection between these two parts is clearly shown.

When form 15 is moved into tucking position (direction indicated by arrow) the following takes place: Crank 18 up, rod 17 up, notched link 25 up, rod 26 up, left end of lever 27 down, rod 29 down, right end of lever 30 up, rod 33 up, end 38 of rod 34 down and out of engagement with roller 39, rod 45 to the right under tension of spring 46 and wheel 49 contacting plate 57 thereby engaging the clutch.

When the form 15 is moved out of the tucking position and into the turning position (Fig. 5) by cam 96 the following takes place: rod 17 down, crank 18 down, shaft 14 rotated counter clockwise and form 15 swung out into alignment with supporting form 1. Shortly thereafter lug 64 on worm gear 59 completes one rotation and again contacts rod 65 which bears against the top of rocker arm 37. The bottom of arm 37 moves to the left and forces end 38 against shaft 45 and disengages the clutch.

Carriage 101 (Fig. 6) is suitably mounted on vertical guideways 120 attached to superstructure pieces 12 by bolts 121. Cross bars 122 and 123 of the carriage support four preferably solid rods or finger plungers 124, 125, 126 and 127. Two thumb blades or plungers 128 (one for right hand gloves and one for left hand gloves) are mounted on opposite sides of bar 123 on projections 130 (Figs. 1 and 6).

When carriage 101 is raised to the position shown in dotted lines (Fig. 6) plungers 124—128 enter corresponding open ended tubes 132, 133, 134, 135, and 136 which support the fingers and thumb of a glove. The material comprising the fingers and thumb is tucked against the inside walls of each tube.

Plungers 124, 125 and 127 are each spring mounted near their bases by springs 138, 139 and 140. Plunger 126 is not spring mounted since it enters the longest tube 134 bearing the middle finger of the glove and the height to which carriage 101 is raised is measured by the distance plunger 126 must travel to reach a stop 142 in tube 134. Since it is desired that all the glove fingers be turned by the time the middle finger is turned, the plungers are made inversely long with respect to the tubes they enter. Stops 142 are provided in each tube at a distance from the open end of the tube corresponding to the distance required to tuck a finger completely within the tube. Plungers 124, 125 and 127 contact stops 142 while carriage 101 is still being raised and thereupon compress their respective springs rather than continuing their upward movement which might mutilate the glove fingers.

Figure 6:
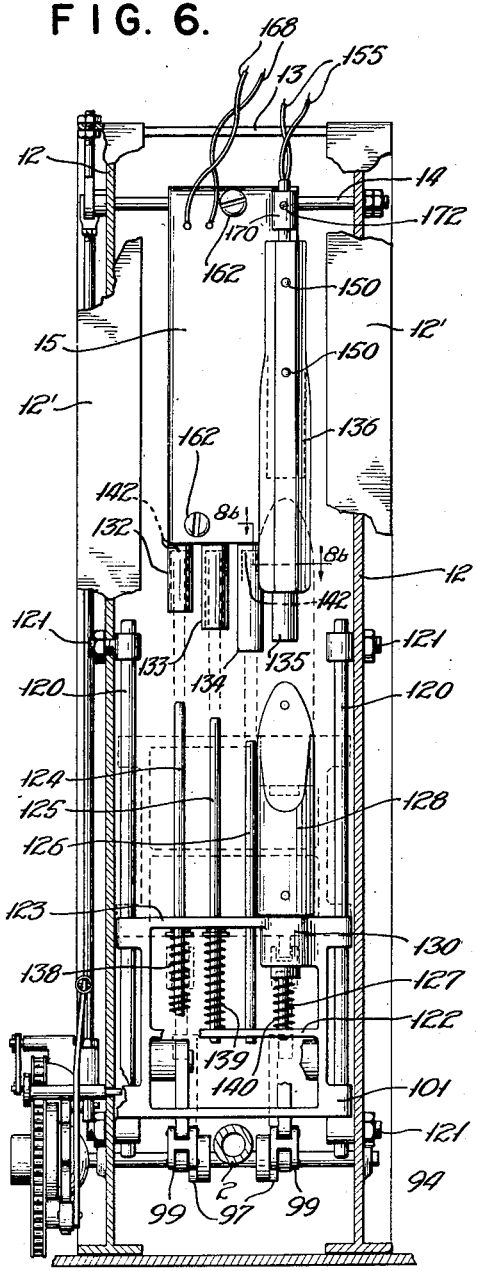
Fig. 6 is a side elevation partly in section of the plunger carriage and turning form.

Each thumb support 136 (Fig. 8) provided on turning forms 15 consists of a hollowed core-like member having two halves 143, 143′ to which the upper portions of two elongated pieces 147 and 148 of good heat conducting resilient metal are fastened by rivets 150 (Fig. 6). One of the rivet holes 150′ is shown in Fig. 8. Each piece 147, 148 has its opposite longitudinal edges 151 bent towards one another. Normally pieces 147 and 148 contact each other throughout their entire length along edges 151. Pieces 147 and 148 need not necessarily be shaped as illustrated but may be rounded or otherwise shaped as long as edges 151 form some sort of gripping surface between them.

Each thumb plunger 128 is preferably formed out of two halves, one of which 128' is shown in Fig. 7, of good heat conducting metal shaped into a thumb like blade and the blade halves are held together by rivets whose holes 129 are shown in Fig. 7. The blades are tapered at their top and at their greatest diameter are slightly greater than the distance between the lower portions of pieces 147, 148. When blade 128 is pushed up into this space, pieces 147 and 148 are forced apart and opposite seams 152 of thumb 153 mounted thereon are forced between edges 151 (Fig. 8a).

The proper shaping and pressing of the thumb is aided by the fact that both blade 128 and support 136 are heated, the former by conductors 144 connected to heating coils 145 in cavity 146 (Fig. 7) and the latter by conductors 155 connected through cylinder 154 in the top of support 136 to heating elements 156 (Fig. 8) provided in cavity 157 between halves 143, 143'. When carriage 101 starts down blade 128 is pulled out of thumb support 136 and because of the tapered shape of the blade, edges 151 move towards one another and clamp seams 152 between them (Fig. 8b). The pressure with which the edges hold the seams is not sufficient to prevent their being easily removed from support 136 when the operator manually turns the glove on to glove supporting form 1. No supporting element is necessary on form 1 for the thumb material because it has attained sufficient rigidity during the tucking and turning operations to remain upright. As form 1 passes between belts 5 and 6 the thumb is presented therebetween in extended position and passes therethrough without folding or creasing.

As shown in Fig. 9 it is possible to make the finger supports of the glove turning form as well as the thumbs of two resilient pieces 158, 159 which may be spread apart the same as thumb pieces 147 and 148.

Glove turning form 15 is preferably made out of two halves one of which 160 is shown in Fig. 10. The halves are held together by screws 162 fitting into holes 163. A cavity 165 is provided in one or both halves into which heating coils 167 connected to conductors 168 (Fig. 6) are situated. A projection 170 having hole 173 for conductors 155 of thumb supports 136 is provided in the top of each half. Set screw 172 (Fig. 6) passes through projection 170 and presses against cylinder 154 thereby holding element 136 in place. Finger supporting tubes 132-135 are fastened within cut-out portions 175 of halves 160, 161 (Fig. 10a) by set screws whose holes 176 are shown in Fig. 10. The size of the tubes may thus be changed depending on the size of the gloves being turned. Similarly the plungers may be changed depending on the length of the tubes. The heat generated by coils 167 is transmitted to the whole form and particularly to tubes 132—135 thereby facilitating the passage of gloves over the turning form.

Figure 11:
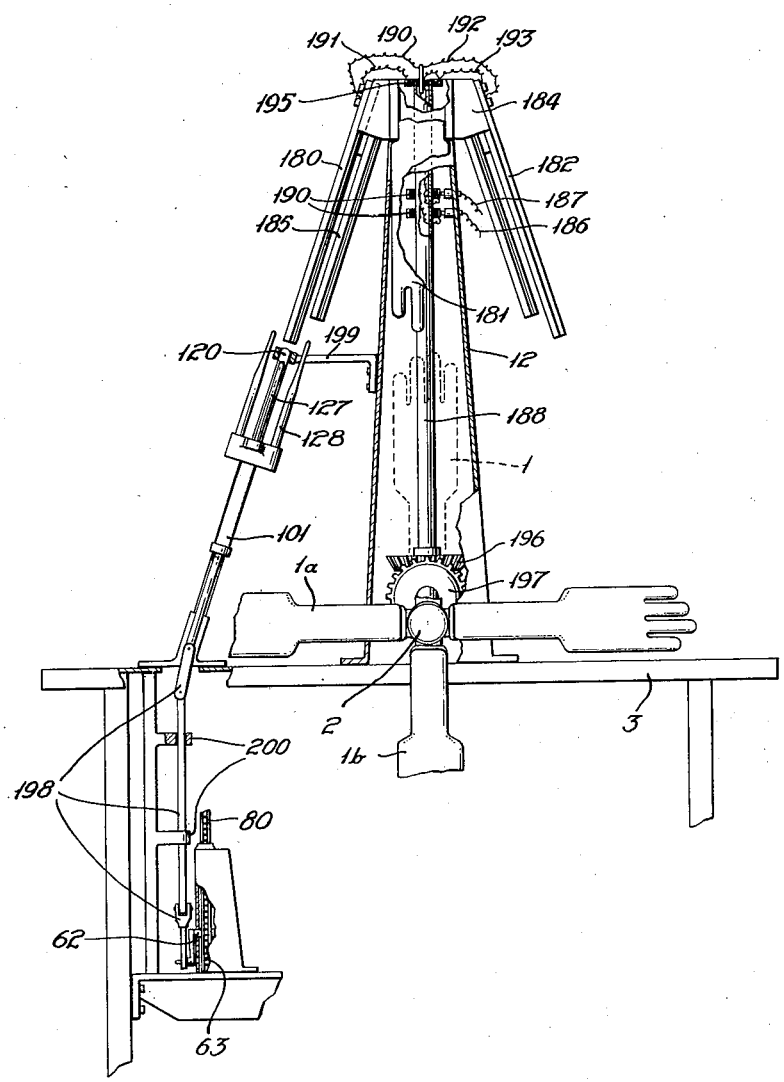
Fig. 11 is a side elevation partly broken away of another embodiment of my invention in which four turning forms are provided.

According to one embodiment of my invention, Fig. 11, four turning forms only three of which are shown, 180, 181 and 182 are suitably secured to a mounting 184 on top of superstructure 12. Turning forms 180—182 are similar to previously described turning form 15 except that each has only one thumb supporting element 185 instead of the two elements 128 provided on form 15. Forms 180, 182 on opposing sides of the superstructure have thumb supporting elements for one hand, such as the right, and the other two forms 181 and the form not shown, are provided with thumb supporting elements for left-handed gloves. The forms as well as their thumb supporting elements are individually heated by means of conductors 186 and 187 connected to a hollow rotating shaft 188 by slip rings 190. At the top of shaft 188 conductors such as 190, 191, 192 and 193 connect via slip ring 195 heating elements similar to elements 145 and 167 in each turning form to conductors 186 and 187.

Mounting 184 is suitably secured to the top of shaft 188 which is substantially perpendicular to shaft 2. A bevel gear 196 on the bottom of shaft 188 is engaged by a bevel gear 197 of shaft 2. By means of a Geneva movement similar to that shown in Fig. 1 the turning forms are rotated about shaft 188 and describe a circle substantially parallel to table 3.

Shaft 62 beneath table 3 rotated by sprocket wheel 63 and sprocket chain 80 is connected to plunger carriage 101 by suitable crank and linkage means generally indicated at 198. Carriage 101 rides in guideways 120 and is similar in all respects to the carriage and plunger means described in relation to Fig. 6. A bracket 199 extends from the superstructure and aligns plungers 127, etc. with corresponding tubes in glove turning form 180. Brackets 200 guide and steady linkage means 198 as it is raised and lowered.

The present embodiment of the machine may be conveniently operated by two operators in the following manner—one operator places a wrong side out glove on form 182 which is at the loading position to the right of the machine. The other operator who is at the turning position in the front of the machine strips a glove from form 181 onto form 188. Before arriving at the turning position the glove passes through the tucking position to the left of the machine where its fingers and thumb are tucked as previously described. The machine is continually operating and the turning forms are successively rotated into the different positions. Thus it will be seen that two gloves may be loaded on the turning forms while two others are being respectively tucked and turned. In this way the loaded gloves will be thoroughly heated by the heated turning forms prior to the tucking and turning operations. As above mentioned this preheating greatly facilitates turning and tucking and especially in the case of leather gloves permits simultaneous turning of all the fingers and the thumb. If desired it would be possible to mount more than four turning forms on mounting 184 thereby increasing the preheating time for each glove.

It will be obvious that various other changes, other than those indicated, could be made in the turning and pressing machine that is the subject of this invention without departing from the latter as defined in the following claims. It is, therefore, intended that all matter contained in the foregoing description or shown in the drawings will be interpreted as illustrative and not in a limiting sense.

What is claimed is:

1. In a machine for turning and pressing gloves, a table, a shaft longitudinally supported on the table, a plurality of glove supporting forms fastened to one end of the shaft, a superstructure on the table extending above the supporting forms, a glove turning form supported from the top of the superstructure, said turning form movable into a loading, a tucking and a turning position, all three positions being situated above the glove supporting forms, plunger means mounted on the table operable for insertion into the turning form in the tucking position, said turning form in the turning position being in end to end alignment with a supporting form, the plane of said turning form in the loading position intersecting the plane of a glove supporting form, and clutch means for controlling the operation of the plungers.

2. In a machine of the character described, a table, a shaft longitudinally supported on the table, equally spaced movable glove supporting forms fastened at an acute angle to one end of the shaft, a superstructure extending above the supporting forms, a heated glove turning form rotatably fastened near the top of the superstructure and projecting towards the table, a carriage mounted in the bottom of the superstructure, plunger means supported in the carriage operable to register with the turning form, the turning form being in a tucking position when perpendicular to the table and in alignment with the plunger means, said turning form movable into a turning position when in end to end alignment with a supporting form and into a loading position when its plane forms an angle with the plane of a raised supporting form, and clutch means for controlling the movement of the carriage and for moving the turning form from tucking position into turning position, said clutch being controlled by the movement of the turning form.

3. The machine according to claim 2, and in which a notched link connected to the turning form cooperates with a lever to insure proper positioning of the turning form in all its positions.

4. The machine according to claim 3, and in which a cammed surface cooperates with the notched link to move the turning form into turning position after completion of the tucking operation.

5. The machine according to claim 2, and in which the turning form has four open-ended tubes projecting therefrom corresponding in length to the material of the fingers of the glove, each tube supporting a finger of the glove and in tucking position aligned with respect to a plunger so that each plunger enters the open end of a tube and tucks the finger material against the side walls of the tube, and a plunger stop within each tube for stopping the movement of a plunger after all the material comprising a finger has been tucked.

6. The machine according to claim 5, and in which the plungers corresponding to the first, third and fourth fingers are spring mounted to compress the springs upon striking said plunger stops.

7. In a machine of the character described, a thumb support for a glove turning form, said support comprising two elongated pieces of resilient metal having upper and lower portions, a hollow core, rivets for fastening the upper portions of the elongated pieces to the core and to one another, heating coils within the core for heating said pieces, opposite longitudinal edges of each piece being bent towards one another and normally contacting the corresponding edge of the other piece so as to form a space therebetween, said lower portions adapted to be spread apart to clamp the material of a glove thumb therebetween.

8. The machine according to claim 7, and having a plunger for spreading apart said two thumb pieces comprising a blade tapered at the end which enters the space between the two pieces, said blade generally having the shape of a thumb and a diameter such as to cause the lower portions of the pieces to spread apart and force the material of the thumb out between the edges, and a heating element within the plunger.

9. In a machine of the character described, a glove turning form having four finger supporting elements and a thumb supporting element, each of said elements comprising two elongated pieces of resilient metal having upper and lower portions, a hollow core to which said upper portions of the pieces are fastened, opposite longitudinal edges of the pieces bent towards one another and normally contacting the corresponding edge of the other piece so as to form a space therebetween, said lower portions adapted to be spread apart to clamp respectively the material of a glove thumb and fingers therebetween.

10. The machine according to claim 9, and having corresponding plunger means for entering from the bottom the spaces between the pieces and forcing the material of the thumb and fingers out between the longitudinal edges of the pieces.

11. In a machine of the character described, a table, a first shaft longitudinally supported on the table, at least one glove supporting form fastened to one end of the first shaft, a second shaft connected to the first shaft, at least one glove turning form fastened to the second shaft and circularly movable about the second shaft into a plurality of positions while projecting towards the table, plunger means operable to engage the turning form, lifting means connected to the plunger means for moving the plunger means into engagement with the turning form while in tucking position, the turning form being in turning position when in end to end alignment with the supporting form and in loading position when the first thing its downwardly projected plane intersects is the table.

12. In a machine for turning and pressing gloves, a table, a first shaft longitudinally supported on the table, a plurality of glove supporting forms fastened to one end of the first shaft, a superstructure extending above the supporting forms, a second shaft within the superstructure having one end connected to the first shaft, a plurality of glove turning forms fastened to the second shaft, said last-mentioned forms projecting towards the table, lifting means, plunger means operable to register with successive turning forms, linkage means connecting the plunger means to the lifting means for successively moving the plunger means into engagement with each turning form, each turning form being in tucking position when in end to end alignment with the plunger means, each turning form being in turning position when in end to end alignment with a supporting form and in a loading position when the first thing its downwardly projected plane intersects is the table, each time the first shaft rotates the plunger means being raised to register with a supporting form and a different glove supporting form being aligned with a turning form.

13. In a machine for turning and pressing gloves, a table, a first shaft longitudinally supported on the table, a plurality of glove supporting forms fastened to one end of the first shaft, a superstructure extending above the supporting forms, a second shaft within the superstructure substantially perpendicular to the first shaft and having one end connected thereto, a rotatable mounting connected to the other end of the shaft at the top of the superstructure, a plurality of glove turning forms fastened to the mounting and at an acute angle to the longitudinal axis of the shaft, said last-mentioned forms projecting towards the table and describing a circle substantially parallel to the table, a third shaft beneath the table, plunger means outside the superstructure operable to register with successive turning forms, linkage means connected to the third shaft for successively lifting the plunger means into engagement with each turning form and lowering the plunger means as said shaft revolves, each turning form being in tucking position when in end to end alignment with the plunger means, each turning form being in turning position when in end to end alignment with a supporting form and in a loading position when the first thing its downwardly projected plane intersects is the table, and ironing means for removing the gloves from the supporting forms and pressing the gloves.

14. In a machine of the character described, a turning form for a glove, a support for the thumb of the glove comprising two elongated members each having a free end, supporting means to which the other end of each of said members is fastened, the members contacting each other along substantially their entire length whereby the glove material may be clamped between said members.

15. Apparatus according to claim 14, and in which said free ends are rounded and in substantially the same planes as the corresponding members.

TEOBALDO G. BOLDIZZONI.

REFERENCES CITED

The following references are of record in the file of this patent:

UNITED STATES PATENTS

| Number | Name | Date |
|---|---|---|
| 2,148,403 | Gerber et al. | Feb. 21, 1939 |
| 2,199,778 | Brownstein | May 7, 1940 |
| 2,286,059 | Brownstein | June 9, 1942 |
| 2,426,698 | Leach | Sept. 2, 1947 |
| 2,434,816 | Suftko | Jan. 20, 1948 |